United States Patent [19]

Kowalski

[11] Patent Number: 5,081,597

[45] Date of Patent: Jan. 14, 1992

[54] PROCESS FOR DYNAMICALLY EQUALIZING MULTICHANNEL OPTICAL IMAGING SYSTEMS

[75] Inventor: Robert P. Kowalski, Campbell, Calif.

[73] Assignee: Xerox Corporation, Stamford, Conn.

[21] Appl. No.: 454,349

[22] Filed: Dec. 21, 1989

[51] Int. Cl.$^5$ .............................................. G06F 15/20
[52] U.S. Cl. ................................ 364/525; 364/571.02; 364/571.04; 364/581
[58] Field of Search ............... 364/525, 572, 574, 581, 364/571.02, 571.04; 346/160; 356/356; 382/53, 65; 350/356, 96.25

[56] References Cited

U.S. PATENT DOCUMENTS

| | | | |
|---|---|---|---|
| 4,636,039 | 1/1987 | Turner | 350/356 |
| 4,809,194 | 2/1989 | Crookshanks | 364/581 |
| 4,956,796 | 9/1990 | Rogers et al. | 364/581 |

*Primary Examiner*—Thomas G. Black
*Assistant Examiner*—Ellis B. Ramirez

[57] ABSTRACT

In accordance with the present invention, correction factors for dynamically equalizing the optical channels of a multichannel optical imaging system, individually or on a group-by-group basis, are recursively computed while the imaging system is idle (i.e., not printing) through the use of an iterative process comprising the steps of: measuring the output intensities of the respective sets of channels, sequentially comparing the measured channel intensities against a system calibrated reference intensity level, and adjusting the correction factor for each set of channels that is found to be operating at an intensity level deviating from the reference intensity level in the direction that is required to reduce the magnitude of the deviation (unless the correction factor value already is at the limit of its dynamic range in that direction). Preferably, the correction factor adjustments are made by incrementing and decrementing their least significant values, thereby maximizing the sensitivity of each iteration of the process to the affect of the immediately preceding iteration on the amount of crosstalk occurring between neighboring sets of channels. For example, the correction factors suitably are multi-bit binary values which are adjusted by incrementing and decrementing their least significant bits (LSB's). The reference intensity level typically is calibrated by measuring the uncorrected output intensities of the respective sets of channels and by then selecting the intensity of the set of channels which is determined to be operating at the lowest valid intensity level for use as the reference intensity. Advantageously, this calibration procedure is repeated on a predetermined schedule for recalibrating the reference level from time-to-time to correct for gradual drift in the optical characteristics of the imaging system.

4 Claims, 9 Drawing Sheets

PROCESS FOR DYNAMICALLY EQUALIZING MULTICHANNEL OPTICAL IMAGING SYSTEMS

FIELD OF THE INVENTION

This invention relates to multichannel optical imaging systems and, more particularly, to an improved process for dynamically equalizing their optical channels.

CROSS-REFERENCE TO RELATED APPLICATION

A concurrently filed and commonly assigned U.S. patent application of Sprague et al on "Dynamic Equalization of Multichannel Optical Imaging Systems" (U.S. Ser. No. 07-454,564) relates to methods and means for optically rebalancing the optical channels of multichannel imaging systems dynamically. This invention, in turn, provides a process for more precisely equalizing the optical channels of such systems by recursively computing the correction factors using an iterative process which is sensitive to variations in the level of optical crosstalk between the channels, such as may be caused by the equalization process.

BACKGROUND OF THE INVENTION

In the context of this disclosure, a "multichannel optical imaging system" has a plurality of spatially parallel optical channels to supply a like number of more or less independently modulated optical stimuli for writing images on a photosensitive recording medium. There are known optical image bars and multispot laser scanners which respond to this definition. Furthermore, the definition embraces imaging systems which have a plurality of distinct optical recording beams, as well as systems of the type in which a single beam is spatially modulated to provide a plurality of generally parallel optical stimuli.

The parallelism of multichannel optical imaging systems is attractive, especially for high speed printing. As a general rule, image bars are oriented so that their optical channels are spatially displaced from each other in the tangential direction at the image plane (i.e., transversely with respect to the imaging field) for line printing and similar applications. Multispot raster output scanners (ROS's), on the other hand, typically are oriented so that their optical channels are offset from each other in the sagittal direction (sometimes referred to as the "process" direction) at the image plane. Multispot ROS's usually have only a few channels, but optical image bars often have many.

Despite their functional and structural differences, most multichannel optical imaging systems perform best when their channels are well balanced optically. Significant, unintended differences between the nominal (i. e., unmodulated) optical illumination or optical transmission characteristics of the channels of such an imaging system are a potential source of unwanted imaging defects, such as streaks. Unfortunately, however, various factors, such as ordinary electrical and optical drift, as well as the normal accumulation of dust and other environmental contaminants, tend to upset the channel balance of these imaging systems as a function of time. The aforementioned copending application provides a general solution to that problem, but it does not deal with the associated problem which arises when there is significant and unavoidable optical crosstalk among the optical channels of such an imaging system, whereby adjustments made to the nominal optical output intensity of one channel or group of channels affect the nominal optical output intensities of its neighbors.

SUMMARY OF THE INVENTION

For that reason, in accordance with the present invention, correction factors for dynamically equalizing the optical channels of a multichannel optical imaging system, individually or on a group-by-group basis (collectively referred to hereafter as a "set-by-set" basis), are recursively computed while the imaging system is idle (i.e., not printing) through the use of an iterative process comprising the steps of: measuring the output intensities of the respective sets of channels, sequentially comparing the measured channel intensities against a system calibrated reference intensity level, and adjusting the correction factor for each set of channels that is found to be operating at an intensity level deviating from the reference intensity level in the direction that is required to reduce the magnitude of the deviation (unless the correction factor value already is at the limit of its dynamic range in that direction). Preferably, the correction factor adjustments are made by incrementing and decrementing their least significant values, thereby maximizing the sensitivity of each iteration of the process to the affect of the immediately preceding iteration on the amount of crosstalk occurring between neighboring sets of channels. For example, the correction factors suitably are multi-bit binary values which are adjusted by incrementing and decrementing their least significant bits (LSB's). The reference intensity level typically is calibrated by measuring the uncorrected output intensities of the respective sets of channels and by then selecting the intensity of the set of channels which is determined to be operating at the lowest valid intensity level for use as the reference intensity. Advantageously, this calibration procedure is repeated on a predetermined schedule for recalibrating the reference level from time-to-time to correct for gradual drift in the optical characteristics of the imaging system.

BRIEF DESCRIPTION OF THE DRAWINGS

Additional features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with specific reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
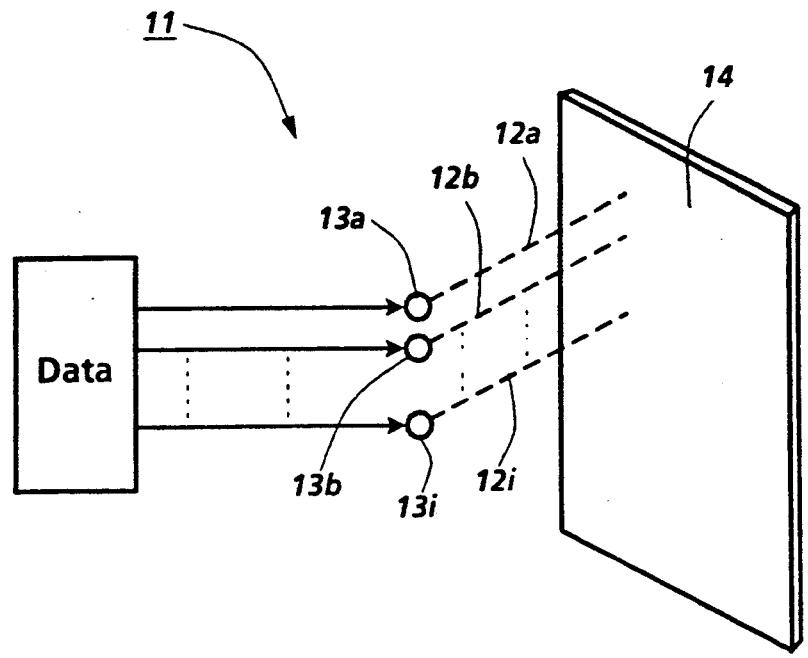
FIG. 1 is a schematic diagram of a generic multichannel optical imaging system.

Turning now to the drawings, and at this point especially to FIG. 1, there is an optical imaging system 11 comprising a plurality of generally parallel optical channels 12a–12i, which have individually addressable optical pixel generators 13a–13i, respectively, for printing images on a photosensitive recording medium 14. In keeping with conventional practices, printing is carried out by more or less independently modulating the output intensities of the pixel generators 13a–13i in accordance with inpu input data samples. Electrical modulation is suitable for some types of pixel generators 13a–13i, while optical modulation is preferred for others. Some imaging systems contemplate analog modulation of their pixel generators 13a–13i, while others are designed for digital ("on/off") modulation. As previously pointed out, the pixel generators 13a–13i may be an array of individually addressable optical modulators which are illuminated by a single radiant source, or they may be respective radiant sources, such as light emitting diodes (LEDs) or lasers, which are internally or externally modulated.

Figure 2A:
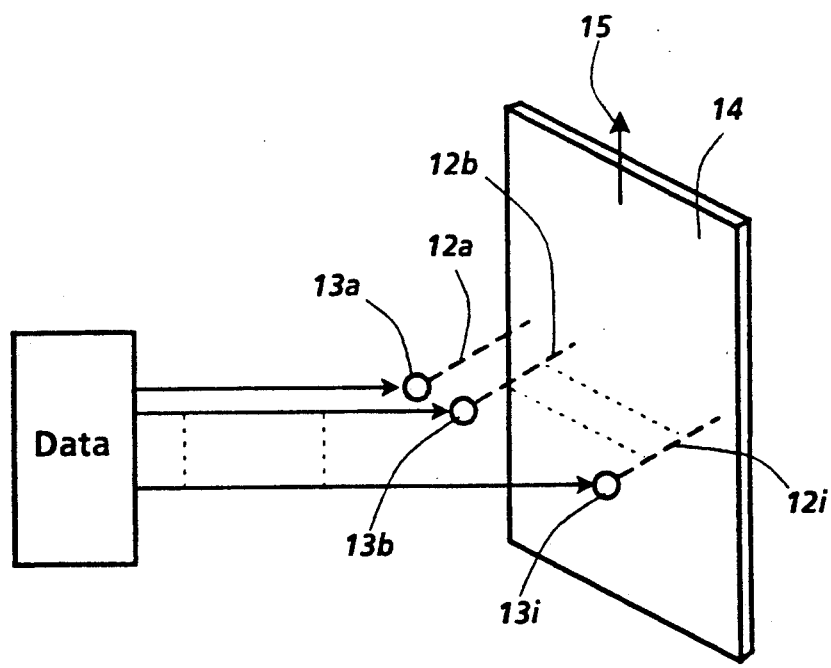
FIG. 2A is a schematic diagram of a multichannel optical image bar.
Figure 2B:
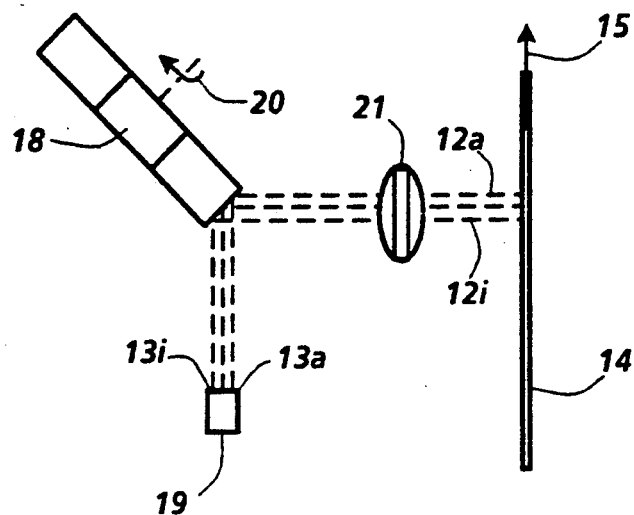
FIG. 2B is a schematic diagram of a multichannel optical ROS.

As shown in FIG. 2A, the pixel generators 13a–13i are distributed widthwise of the recording medium 14 (i.e., in the tangential direction) on substantially equidistant centers for printing images while the recording medium 14 is being advanced (by means not shown) in an orthogonal "process" direction, as indicated by the arrow 15. That, for example, is a classical "image bar" configuration for optical line printing. Alternatively, as shown in FIG. 2B, the pixel generators 13a–13i may be offset from one another in the process direction (i.e., sagittally with respect to the recording medium 14). For instance, a multispot laser ROS conventionally comprises a deflector, such as a rotating polygon 18, for scanning the output beams of a diode laser array 19 across the recording medium 14, as indicated by the arrow 20, while the recording medium 14 is being advanced orthogonally in the process direction, as indicated by the arrow 15. Thus, such a scanner prints images in accordance with a raster scanning pattern.

Multispot laser scanners sometimes utilize interleaved scan patterns, including patterns involving both tangential and sagittal separation of their scan beams, but the details of the various scan patterns they may employ are beyond the scope of this invention. Image bars and multispot scanners conventionally have one or more imaging lens 21 (FIG. 2B) for imaging their pixel generators 13a–13i onto the recording medium 14. Indeed, the input and output optical subsystems of such imaging systems both usually include several optical elements, so it is to be understood that most of the optical details have been omitted in the interest of simplifying this disclosure.

Figure 3:
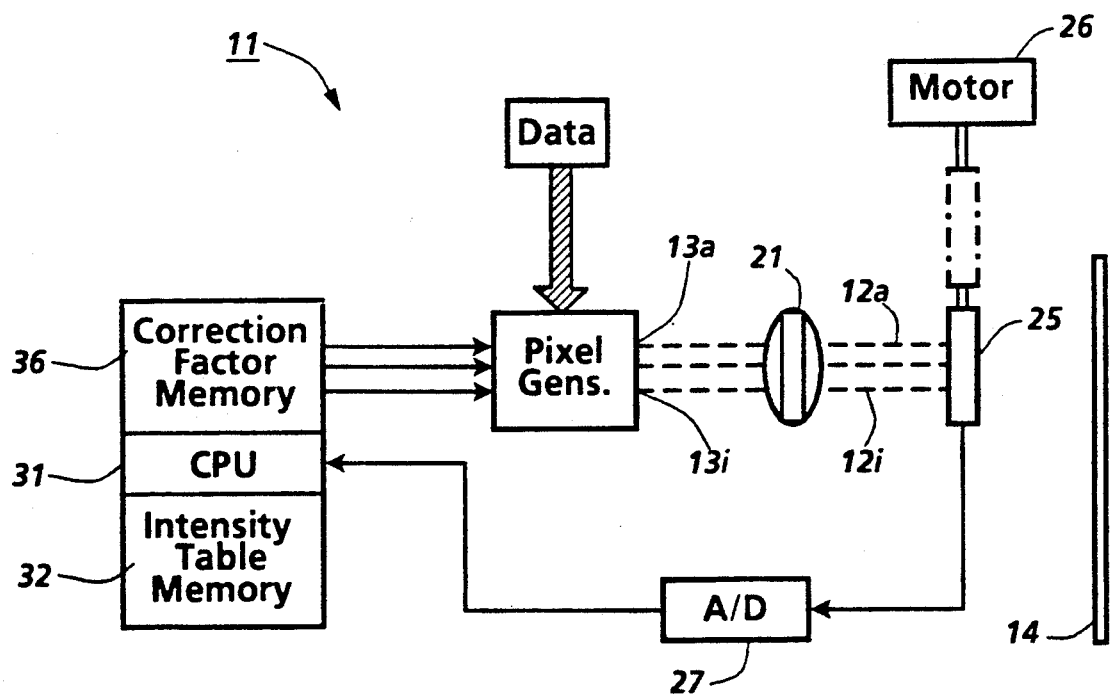
FIG. 3 is a schematic diagram of a multichannel optical imaging system embodying the present invention.

As shown in FIG. 3, a photodetector 25 is provided for quantitatively measuring the output intensities of the optical channels 12a–12i of the imaging system 11 from time-to-time while the imaging system 11 is idle. These intensity measurements are made sequentially at a predetermined sampling resolution or granularity of n channels/measurement, where n is an integer selected from a range 1, 2, ... N/2, and N is the total number of channels within the imaging system. As will be seen, the results of these intensity measurements are employed for producing updated illumination and/or attenuation correction factors which tend to restore the channel balance of the imaging system 11 at a level of discrimination that is determined by the resolution at which the intensity measurements are made. The channel rebalancing process may be carried out cyclically or acyclically whenever the imaging system 11 is idle, but it preferably is performed sufficiently frequently to maintain the channel balance with within an acceptable tolerance under ordinary operating conditions. It may be necessary or desirable to equalize the output intensities of the optical channels of some imaging systems individually (i.e., n=1), but it may be sufficient or more practical to equalize the optical channels of other imaging systems more coarsely on a group-to-group basis (i.e., $1 < n \leq N/2$).

A solenoid actuated motor 26 or the like suitably is coupled to the photodetector 25 for physically inserting it into and removing it from an optical sampling position between the pixel generators 13a–13i and the recording medium 14. For example, as shown, the motor 26 moves the photodetector 25 back and forth between a sampling position (its solid line position in FIG. 3) at the output side of the imaging lens 21 for making the intensity measurements and a storage position (its phantom line position) which is optically remote from the optical channels 12a–12i of the imaging system 11 for ordinary printing. Alternatively, a beam splitter (not shown) could be used for diverting a predetermined percentage of the light collected by the imaging lens 21 to the photodetector 25. Still another alternative is to provide a rotatable mirror (also not shown) for reflectively steering the light collected by the imaging lens 21 toward the recording medium 14 for printing or toward the photodetector 25 for channel rebalancing. Preferably, for performing the intensity measurements, one after another of the channels 12a–12i or groups of channels first is switched "full-on" to operate at its nominal output intensity level and then is switched "full-off" to operate at its "background" intensity level. All of the other channels are maintained in their "full-off" states while the full-on and background intensities of the selected channel or group of channels are being measured.

The resolution, n, at which these intensity measurements are made effectively subdivides the N optical channels 12a-12i of the imaging system 11 into N/n mutually exclusive "sample sets." A dual phase, full-on/full-off intensity measurement cycle is preferred because it allows the photodetector 25 to operate in a relatively fast ac mode, such that its ac output voltage level reliably tracks the full on/background intensity swings of the sequentially sampled channels or groups of channels when the sampling is performed at a relatively high rate. It is to be understood, however, that single phase measurements of the full-on, uncorrected output intensities of the channels could be utilized to determine their relative maximum, uncorrected output intensities at any selected resolution of n channels/-measurement, although that would require a slower dc mode of operation of the photodetector 25 for supplying each of the intensity measurements as a proportional dc voltage level.

An analog-to-digital (A/D) converter 27 is coupled to the photodetector 25 for mapping the measured channel intensities onto a predetermined scale of binary values. For example, the A/D converter 27 suitably employs standard 8-bit words for mapping the intensity measurements onto a binary scale having values ranging from 0 to 255. These binary intensity values, in turn, are applied to an I/O port of a microprocessor 31 to be stored at preselected addresses in a suitable memory 32, thereby providing an up-to-date intensity table 102 (FIG. 10) for characterizing the most recently measured output intensities of the optical channels 12a-12i of the imaging system 11 at the selected sampling resolution, n.

As described in additional detail hereinbelow, after the intensity table for the imaging system 11 has been fully updated, the microprocessor 31 scans it to identify the $n_r$ set of channels which are operating at the lowest valid output intensity level and to determine the binary intensity value for that set of channels. If desired, any binary intensity value may be accepted as "valid," but the microprocessor 31 preferably is programmed to carry out a validation procedure for assuring that the lowest valid intensity value exceeds a threshold which is selected to reject intensity values which are sufficiently low to indicate the existence of defective pixel generators. For example, the validation procedure suitably invalidates any intensity value which falls below a predetermined significant percentage of the average of the intensity values within the intensity table, thereby precluding a relatively small number of defective pixel generators from adversely affecting the equalized output intensities of the non-defective channels of the imaging system 11.

To optically rebalance or equalize the optical channels 12a-12i of the imaging system 11, the microprocessor 31 supplies updated correction factors for causing the non-defective sets of channels to operate approximately at the same nominal output intensity level as the $n_r$ channels which have been found to be operating at the lowest valid output intensity level. These correction factors are stored at preselected addresses in a dual port memory 36, such as a dual port RAM, so that they can be accessed as needed for equalizing the optical channels 12a-12i while the imaging system 11 is operating in its print mode. As will be appreciated, the memories 32 and 36 may be distinct memory devices, or they may different address banks within the same memory device.

Separate correction factors are provided for every n channels of the imaging system 11. As pointed out in further detail hereinbelow, all of these correction factors are reset to a null value when the imaging system 11 is first powered-up, so that the aforementioned intensity table can be built, without being affected by spurious values. Each of the correction factors is represented by a x-bit binary number, so up to $2^x$ different levels of correction are available. For example, five bit correction factors may be utilized to provide thirty-two different levels of correction, with either level zero (00000) or level thirty-one (11111) being the null correction value. As will be recalled, the intensity value of the $n_r$ channels which are found to be operating at the lowest valid output intensity level is utilized by the microprocessor 31 as a reference for adjusting the correction factors for itself and for the other channels of the imaging system 11. Optical crosstalk between neighboring sets of channels may vary as a function of the equalizing corrections that are made to them, so provision is made for making appropriate adjustments to each of the correction factors during each iteration of the equalization process.

Figure 4:
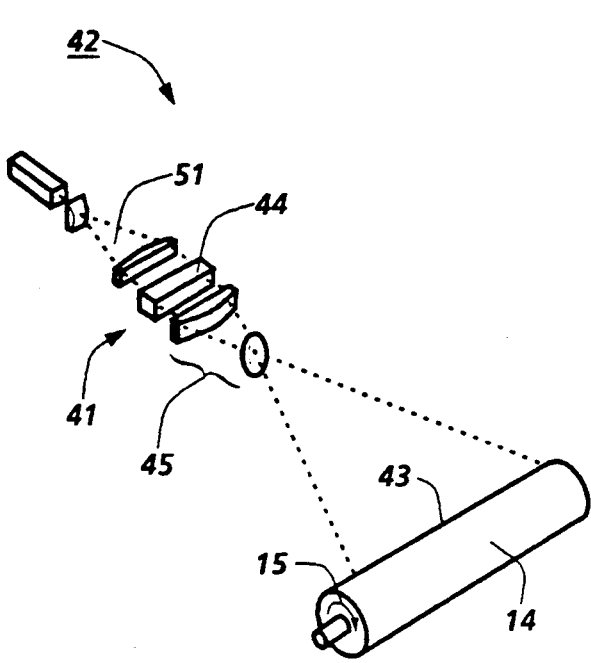
FIG. 4 is a schematic diagram of an optical line printer having an EO TIR image bar with which this invention may be employed to advantage.

Turning to FIG. 4, the present invention may be utilized, for example, to equalize the optical channels of an EO TIR (electrooptic total internal reflection) image bar 41. As more fully described in, for instance, Sprague et al U.S. Pat. No. 4,367,925, which issued Jan. 11, 1983 on "Integrated Electronics for Proximity Coupled Electro-Optic Devices" and which is hereby incorporated by reference, the image bar 41 typically is embodied in a line printer 42 for exposing a photosensitive recording medium 14, such as a xerographic photoreceptor, to a spatially modulated radiation intensity profile 43 while the recording medium 14 is being advanced in the process direction as indicated by the arrow 15. As illustrated, the intensity profile 43 illuminates the full width of the imaging field on the recording medium 14, so it is sequentially spatially modulated in accordance with the data samples for successive lines of an image at a predetermined line printing rate to print the image on a line-by-line basis.

Figure 5:
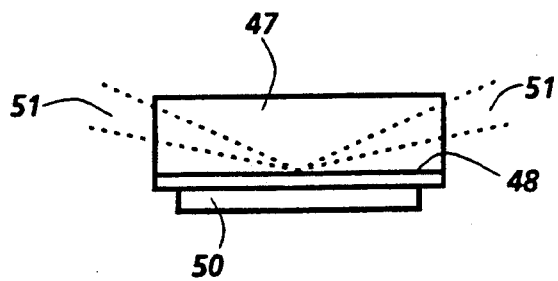
FIG. 5 is a schematic side view of the EO TIR spatial light modulator of the printer shown in FIG. 4.
Figure 6:
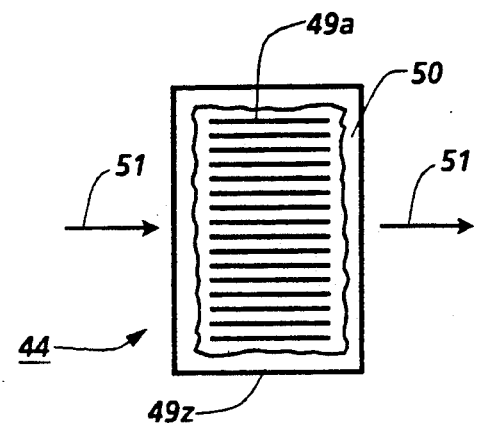
FIG. 6 is a bottom view of the modulator shown in FIG. 5 with certain parts broken away for increased clarity.

As shown in some additional detail in FIGS. 5 and 6, the image bar 41 includes an EO TIR spatial light modulator 44 and a Schlieren imaging system 45 (FIG. 4) for imaging the modulator 44 onto the recording medium 14. The modulator 44, in turn, comprises an optically transparent electrooptic element 47, such as a LiNbO$_3$ crystal, having an optically polished, longitudinal face 48, together with a plurality of individually addressable electrodes 49a-49z which extend lengthwise of the electrooptic element 47 in close proximity to its polished or reflective face 48. Typically, the electrodes 49a-49z are fabricated on a very large scale integrated (VLSI) circuit 50 to integrate them with their addressing and drive electronics.

In operation, essentially the full width of the electrooptic element 47 is illuminated by a sheet-like, tangentially collimated light beam 51. The light beam 51 propagates into the electrooptic element 47 at a near grazing angle of incidence with respect to the reflective face 48, so it essentially is totally internally reflected therefrom. Provision is made for bringing the light beam 51 to a wedge shaped focus on or near the face 48, preferably at about mid-length of the electrodes 49a-49z.

Figure 7:
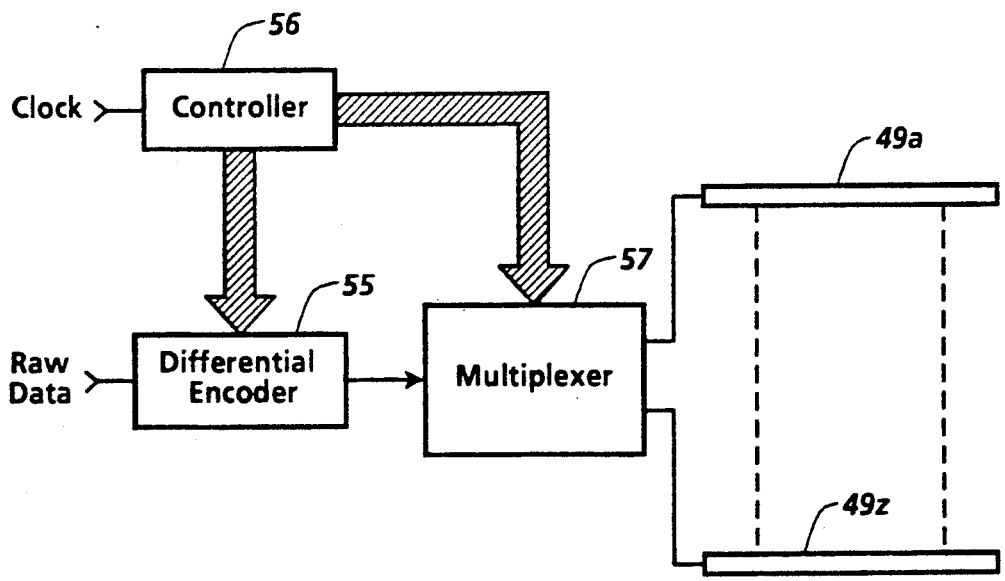
FIG. 7 is a simplified functional diagram of the data input circuitry for the modulator shown in FIGS. 4-6.

Referring to FIG. 7 it will be seen that the raw input data samples are differentially encoded by a differential encoder 55 on a line-by-line basis under the control of a clocked controller 56. During operation, the controller 56 causes a high speed multiplexer 57 to ripple the differentially encoded data samples onto the electrodes 49a–49z of the image bar 44, whereby the raw data samples for successive lines of an image are represented by the voltage drops between neighboring pairs of electrodes during successive line printing times. These electrode-to-electrode potential differences produce proportionately strong fringe electric fields which couple into the electrooptic element 47 (FIG. 5) along essentially the full length of the electrodes 49a–49z, with the depth to which the fields penetrate being determined in substantial part by the dielectric permittivity of the electrooptic element 47. The fringe fields, therefore, locally modulate the refractive index of the electrooptic element 47 widthwise of the modulator 46 in close accordance with the data samples for successive lines of the image. These localized index variations occur within an interaction region through which the light beam 51 propagates while enroute toward and away from the reflective face 48 of the electrooptic element 47. See FIG. 5. Thus, the modulator 44 sequentially spatially modulates the phase front of the light beam 51 in accordance with the data samples for the successive lines of the image. See Turner U.S. Pat. No. 4,636,039 which issued Jan. 13, 1987 on "Non-Uniformity of Fringe Field Correction for Electro-Optic Devices" and which is hereby incorporated by reference.

Returning for a moment to FIG. 4, it will be understood that the Schlieren imaging system 45 suppresses either the zero order or the higher order diffraction components of the light beam 51 and brings its remaining or unsuppressed diffraction components to focus on the recording medium 14, thereby converting the spatially modulated phase front of the light beam 51 into a correspondingly modulated intensity profile 43. Typically, the imaging system 45 is what is known as a "central dark field" Schlieren system, but it is to be understood that some designers might prefer a so-called "central bright field" Schlieren imaging system.

Figure 8:
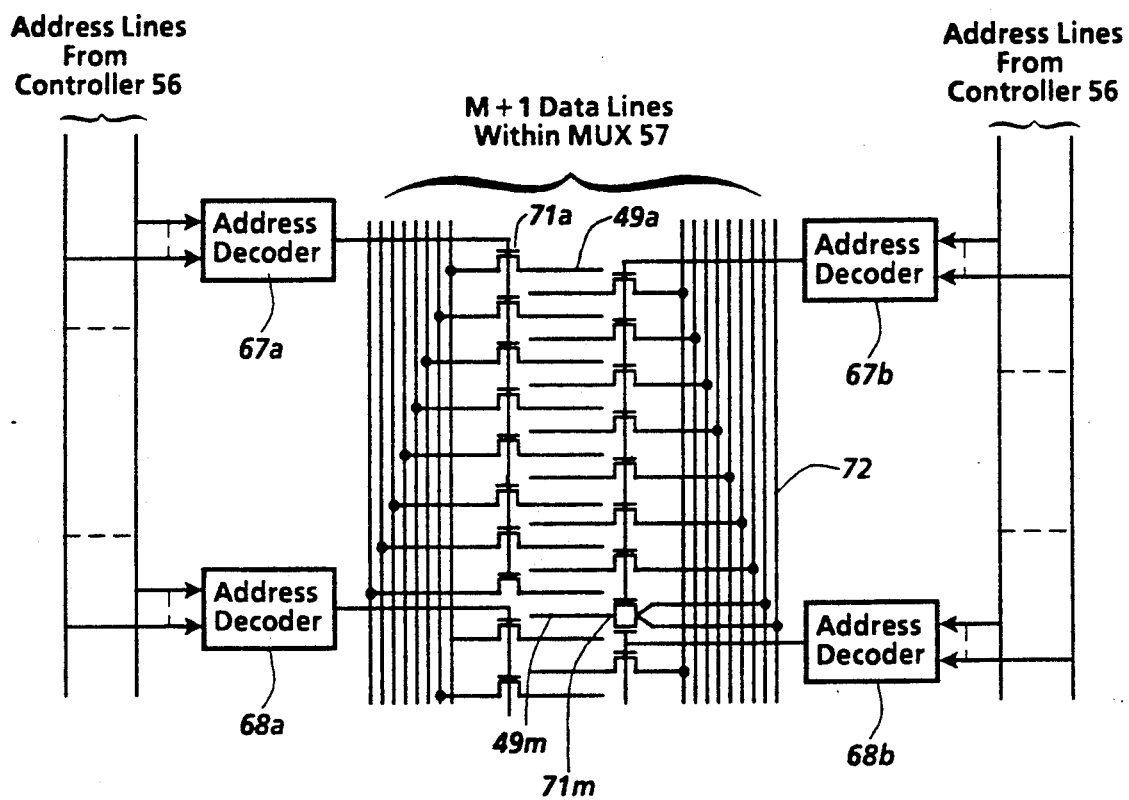
FIG. 8 is a simplified schematic diagram of the addressing and drive electronics for the modulator shown in FIGS. 4-6.

As will be appreciated, the image bar 41 customarily has a large number of optical channels. For that reason, as shown in FIG. 8, the multiplexer 56 suitably has M+1 data output lines; M of which are utilized for serially rippling the differentially encoded data onto the electrodes 49a–49z of the modulator 44 in M-bit wide data words. Successive data words are routed to successive groups of M neighboring electrodes under the control of the clocked controller 56. To that end, address decoders 67a, 67b, 68a, 68b, . . . decode addresses that are supplied by the controller 56 to selectively enable pass transistors or address gates 71a–71m, . . . , for coupling the respective groups of electrodes to the data lines during successive addressing cycles. The address gate for the final or boundary electrode 49m of each simultaneously addressed group of electrodes preferably is an overwrite transistor 71m for refreshing the data on the boundary electrode 49m from a rewrite data line 72 as the next adjacent group of electrodes are being addressed, thereby reducing the distortion such data suffers because of crosstalk occurring from the neighboring groups of electrodes while they are being addressed. For a more detailed discussion of suitable data multiplexing and electrode addressing techniques, see W. D. Turner et al., "Integrated Total Internal Reflection (TIR) Spatial Light Modulator for Laser Printing," August 27-29 SPIE Conference on Advances in Laser Scanning Technology, *Proceedings of the SPIE*, Vol 299, 1982, which is hereby incorporated by reference. As will be seen, that article describes the multiplexing of differentially encoded data samples onto 5376 individually addressable electrodes 51a–51z using a 16 bit wide data word format, so it contemplates sequentially addressing 336 different groups of electrodes, with each of those groups being composed of 16 neighboring electrodes.

Figure 9:
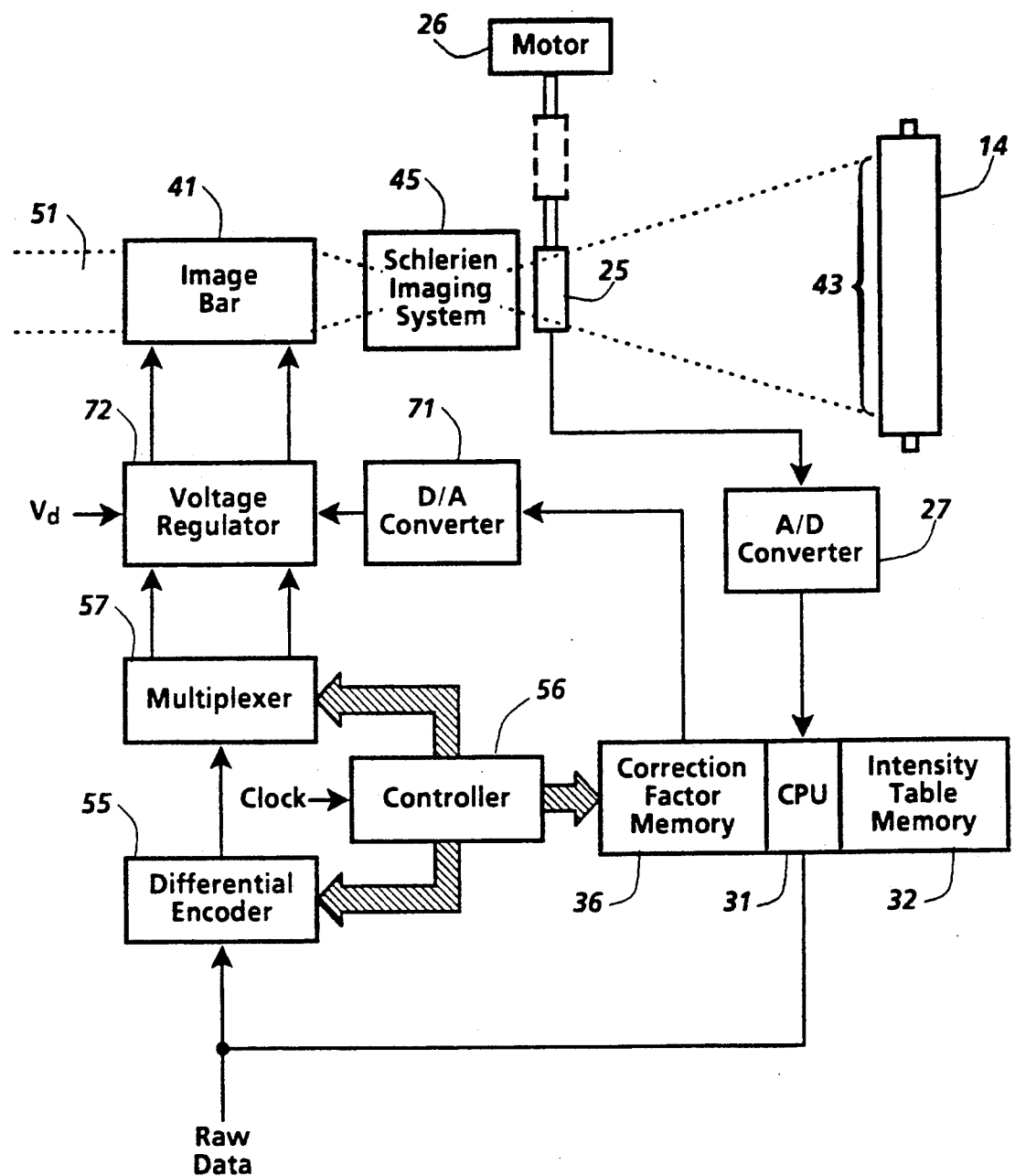
FIG. 9 is a simplified schematic diagram of an embodiment of the present invention for equalizing the optical channels of the printer shown in FIG. 4 on a group-by-group basis.

Turning now to FIG. 9, it will be evident that group-by-group addressing of the electrodes 49a–49z is well suited for dynamically equalizing the optical channels of the image bar 41 on a corresponding group-by-group basis. For measuring the output intensities of the optical channels of the image bar 41 on such a basis, a M-bit wide test pattern of alternating high (1) and low (0) logic level bits is applied to the output data lines of the multiplexer 57 while the controller 56 serially addresses the successive groups of electrodes. This test pattern may be supplied by any suitable means, such as by the microprocessor 31 to be formatted by the differential encoder 55, as shown.

After being formatted, the test pattern consists of essentially "full-on" and "full-off" bits (as defined by the drive voltage limits of the image bar 44), so it maximizes the electrode-to-electrode voltage drops between the neighboring pairs of electrodes within the group of electrodes which the controller 56 happens to be addressing at any given time, thereby causing the optical channels they control (i.e., the channels between those electrodes) to operate at their nominal, unmodulated output intensity levels. As will be understood, the photodetector 25 is maintained in its solid line optical sampling position while the foregoing test pattern is applied to one after another of the groups of electrodes, thereby enabling it to measure the maximum, uncorrected output intensity levels of the optical channels of the image bar 44 on a group-by-group basis. As will be recalled, the above-described intensity measuring cycle preferably is a dual phase cycle in which the full-on test pattern is followed by a full-off test pattern (all "0" or "1" logic level bits) for measuring the full-on and background intensity levels, respectively, of each group of channels.

As previously described, the quantitative intensity measurements the photodetector 25 performs enable the microprocessor 31 to compute correction factors for equalizing the optical channels of the image bar 41 at a desired granularity. These correction factors are recomputed from time-to-time while the printer 42 is idle, thereby recalibrating them to account for any significant dynamic changes in the optical illumination or transmission characteristics of the optical channels of the image bar 41. Accordingly, whenever the printer 42 is requested to perform a printing function, the controller 56 addresses the memory 36 to retrieve the correction factors for one after another of the sets or groups of optical channels in timed synchronism with its addressing of the electrodes for those channels. A D/A converter 71 suitably converts the correction factor that is readout from the memory 36 for any given set of optical channels into a proportional analog control voltage for a data line voltage regulator 72. The control voltage, in turn, causes the voltage regulator 72 to regulate the potential difference between the high ("1") and low ("0") logic level bits of the differentially encoded data that is applied to the electrodes for the given optical channels, thereby causing those channels to operate approximately at the reference intensity level under nominal operating conditions (i.e., in the absence of data modulation). The output intensities of the optical channels which are controlled by the other groups of electrodes are similarly corrected by their correction factors, so substantial group-to-group optical equalization is achieved.

Figure 10:
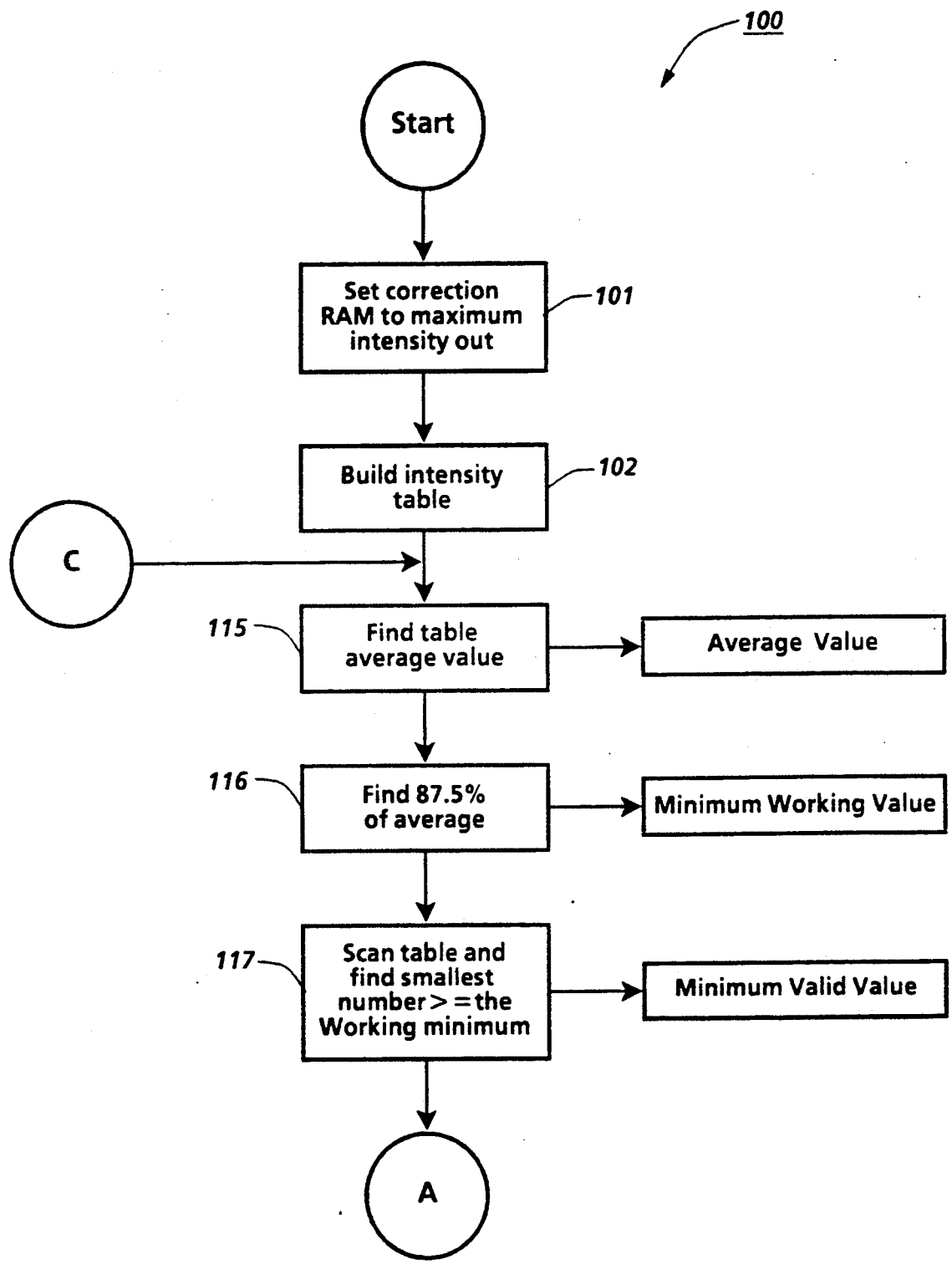
FIG. 10 is a functional flow diagram of a routine for calibrating the reference level for the equalization process of the present invention.

Referring to FIG. 10, it will be seen that there is a calibration routine 100 for calibrating the reference intensity level to which the imaging system is to be equalized. This routine and the other routines which are described hereinbelow will be described in the context of equalizing the optical channels of the image bar 41 (FIG. 4-9) on a group-by-group basis, but it will be evident that they may be straightforwardly modified as required to perform the equalization at any desired granularity.

Figure 11:
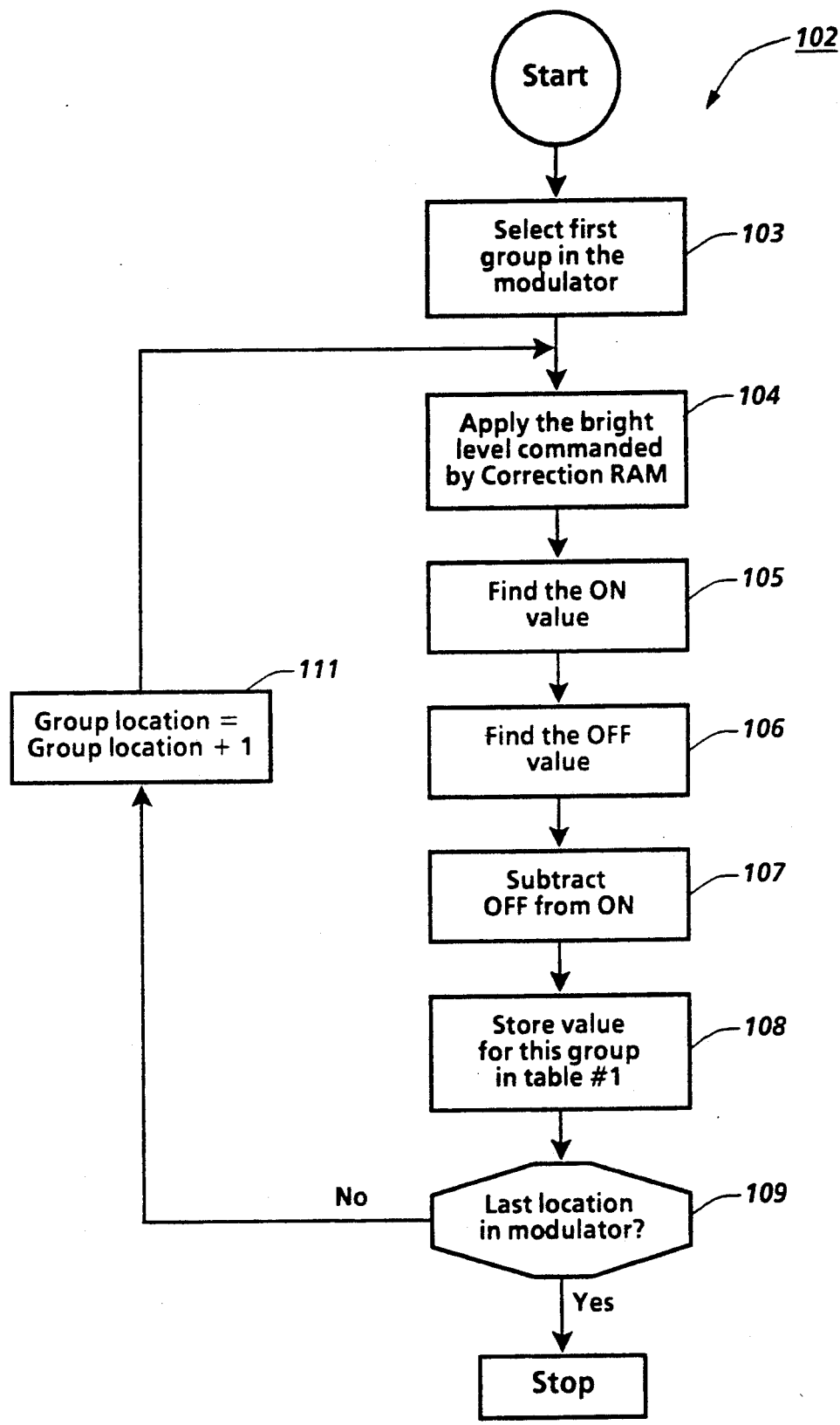
FIG. 11 is a functional flow diagram of a subroutine for building an intensity table to characterize the output intensity levels of a multichannel optical image bar at a preselected granularity.

As shown in FIG. 10, the memory 36 (FIG. 9) is initialized when the imaging system 41 is powered-up so that all of the correction values are reset to null values, as at 101, prior to invoking a build intensity table subroutine 102 for constructing an intensity table for the image bar 41. Referring for a moment to the FIG. 11, it will be seen that the build intensity table subroutine 102 constructs an intensity table for the image bar 41 by initially addressing the first group of electrodes, as at 103, to apply a dual phase test pattern to them, as at 104. As a result, the difference between the full-on intensity level 105 and the background intensity level 106 of the optical channels the first group of electrodes control can be determined, as at 107, to provide a corresponding binary intensity value for storage in the memory 32 (FIG. 9), as at 108. This procedure is repeated, as at 109, to address one after another of the other groups of electrodes, as at 111, whereby binary intensity values representing the uncorrected output intensity levels of the optical channels they control are determined and loaded into the memory 32, as at 104-109, to complete the construction of the intensity table.

Returning to FIG. 10, to prevent defective channels from materially influencing the equalization of the image bar 41, the reference intensity level to which the image bar 41 is to be equalized is calibrated by first finding the average of the values within the intensity table, as at 115, thereby permitting a minimum threshold (i.e., a "minimum working level") for the reference intensity to be set adaptively at a preselected, significant percentage of the average intensity level, as at 116. Thereafter, the intensity table is scanned to select, as at 117, the intensity value of the set of channels that (i.e., the "minimum valid value") is found to be operating at, or the least amount above, that minimum working level threshold as the reference intensity value (i.e., the "minimum valid value") for the image bar 41.

Figure 12:
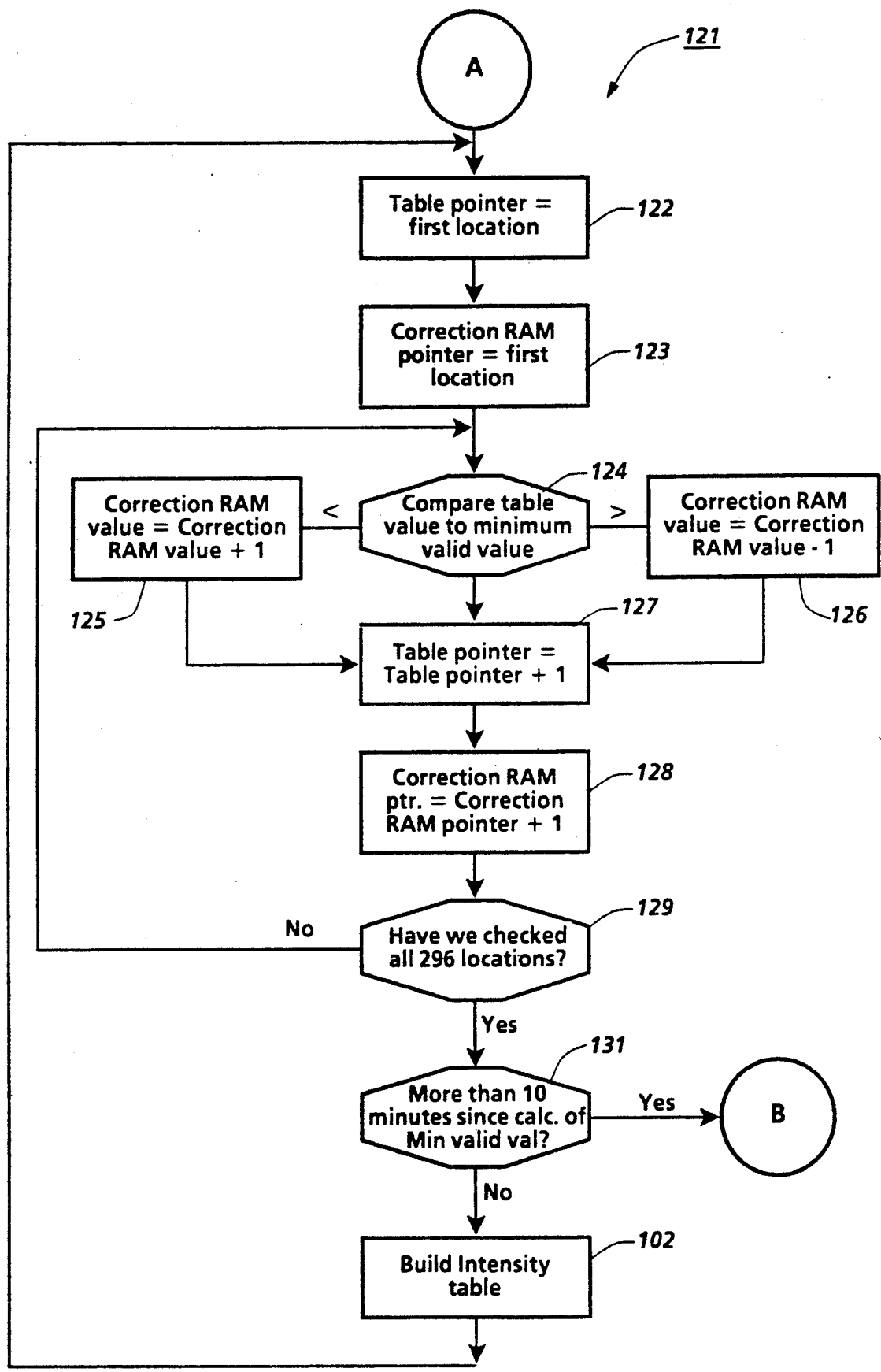
FIG. 12 is a functional flow diagram of a routine for adjusting the correction factors for a multichannel optical image bar to equalize its optical channels at a preselected granularity in accordance with this invention.

Referring now to FIG. 12, an equalization routine 121 iteratively adjusts the correction factors for the optical channels of the image bar 41 to cause the "equalizable" groups of channels to operate at or near the reference intensity level. As previously pointed out, defective pixel generators may prevent one or more of the groups of channels from being equalized, so it is to be understood that the correction factors for those "non-equalizable" channels sooner or later reach the limit of their dynamic range of adjustment and thereafter remain at that limit.

To carry out the equalization routine 121, pointers are set in the memories 32 and 36 (FIG. 9) to retrieve the most recently measured intensity value for the first set or group of channels from the intensity table and to access the current correction factor for them, as at 122 and 123, respectively. That permits their current intensity value to be compared against the existing reference intensity level for the image bar 41, as at 124, to determine whether this first group of channels is operating above, below or at the reference intensity level. Assuming that this first group of channels is "equalizable" and that correction value level thirty-one (11111) is the null correction value, the value of correction factor for the first group of channels is incremented as at 125 if its output intensity is below the reference intensity level, decremented as at 126 if its output intensity exceeds the reference intensity level, or maintained at the current value if this particular group of channels is operating at the reference intensity level. After any necessary adjustment has been made to the correction factor for the first group of channels, the memory pointers are incremented, as at 127 and 128, to determine whether the correction factor for the next group of channels needs to be further adjusted to equalize them to the reference intensity level. As will be seen, the foregoing process is repeated at 129 to sequentially compare the output intensities of the respective groups of channels against the reference intensity level, thereby permitting the correction factors for the equalizable groups of channels which are not well balanced with respect to the reference intensity level to be incremented or decremented as required to reduce their imbalance.

Upon completing each equalization pass, the equalization routine 121 checks at 131 to determine it is time to recalibrate the reference intensity level or not. If it is not yet time to recalibrate the reference intensity level, the equalization routine 121 invokes the build intensity table subroutine 102 for updating the intensity table, thereby causing the intensity table to track the corrected output intensity levels of the optical channels of the image bar 41. After updating the intensity table, the equalization routine 121 initiates another compare/adjust process, as at 102, 122-129 and 131, to determine whether any further adjustments to any of the correction factors for the respective sets of channels are needed or not. Preferably, all necessary adjustments to the correction factors are made by incrementing or decrementing their LSB's, thereby minimizing the iteration-to-iteration variations in the optical balance of the image bar 41. That, in turn, maximizes the sensitivity of the equalization process to changes that may occur, while the correction factors are being adjusted, to the level of optical crosstalk between neighboring groups of channels.

Figure 13:
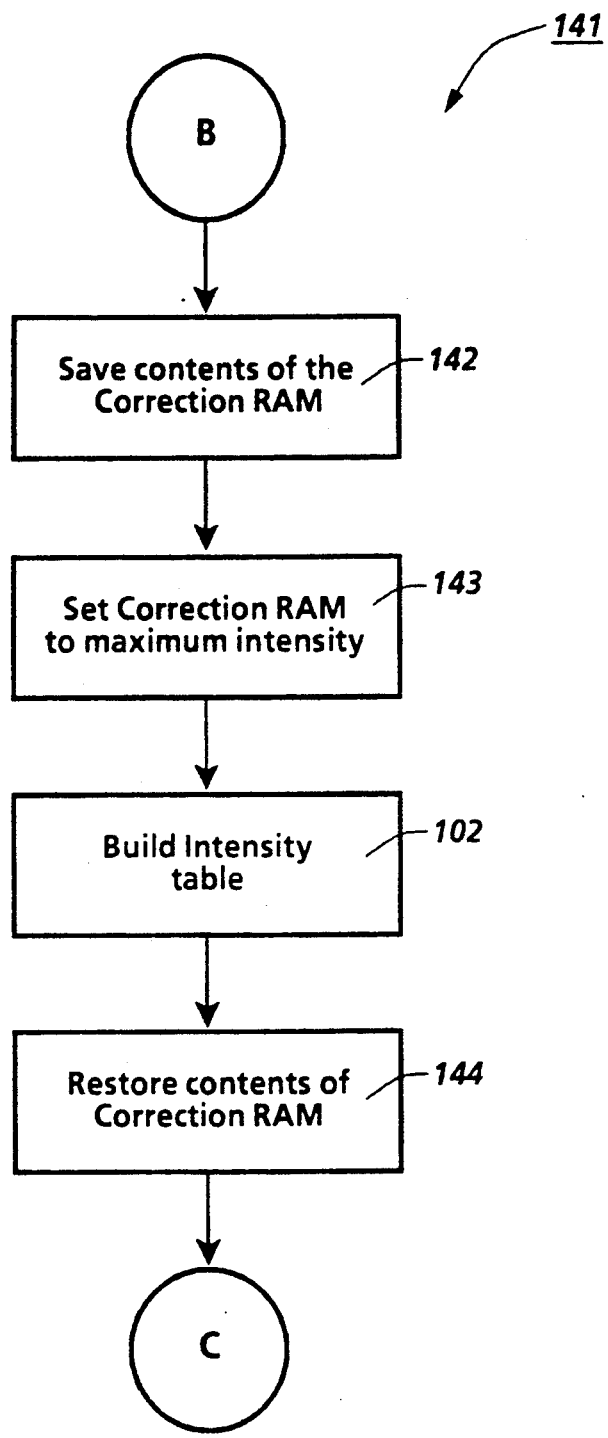
FIG. 13 is a functional flow diagram of a routine for updating the reference level for the equalization process.

Advantageously, the reference intensity level for the image bar 41 is recalibrated from time-to-time. For that reason, whenever the equalization routine 121 determines at 131 that a predetermined time period has past since the reference intensity was last calibrated, it invokes an reference level updating routine 141 (FIG. 13). As shown, the updating routine 141 causes the previously computed correction values for the image bar 41 to be transferred to temporary storage locations, as at 142 and then resets all addresses within the correction memory 36 (FIG. 9) to null correction values. Next, the updating routine 141 invokes the build intensity table subroutine 102 (FIG. 10) to build an up-to-date, uncorected intensity table for the image bar 41, and it then causes the previously computed correction factors to be reloaded, as at 144, into the appropriate addresses within the correction memory 36 (FIG. 9). Thereafter, the reference level updating routine invokes the computational steps 115 and 116 of the calibrate routine 100 (FIG. 10), whereby a recalibrated reference intensity level for the image bar 41 is established at 117.

Inasmuch as the correction factor values preferably are adjusted by incrementing and decrementing their LSB's, the number of correction levels that are provided determines the number of iterations of the equalization routine 121 (FIG. 11) that are required to equalize the image bar 41. For example, if the correction factors are five-bit binary values to provide thirty-two different levels of correction, thrity-two iterations of the equalization process are need for equalizing the image bar 41 each time the reference level is recalibrated. However, once equalization has been achieved for a given reference level, subsequent iterations of the equalization process effectively are independent of each other because they merely compensate for perturbances to the optical balance of the imaging system 41.

CONCLUSION

In view of the foregoing, it will now be understood that the present invention provides a precision process for dynamically equalizing the optical channels of various types of multichannel optical imaging systems. Furthermore, it will be evident that such equalization may be provided for multichannel optical imaging systems which are driven by input data in various forms, including systems which are driven by differentially encoded data.

What is claimed:

1. A process for equalizing an optical imaging system having a plurality of parallel channels, said method comprising the steps of recursively measuring the output intensities of said channels before and after corrective equalization factors are applied to them to provide pre-correction and post-correction intensity measurements; said measurements being performed at a resolution of n channels/measurement, where n=1, 2, . . . N/2, and N=the number of channels contained by said imaging system;

averaging said pre-correction intensity measurements to establish a threshold at a preselected percentage of said average;

selecting one of said pre-correction intensity measurements to establish a reference level, said one intensity measurement being equal to or exceeding said threshold by an amount no greater than any of said other pre-correction intensity measurements;

applying separate corrective equalization factors to each set of n channels to equalize said channels on a set-by-set basis;

iteratively adjusting the correction factors for all equalizable sets of channels based on their output intensity relative to said reference level, whereby the output intensities of the respective equalizable sets of channels are brought into balance with said reference level, even in the presence of a significant level of optical crosstalk between neighboring sets of channels.

2. The process of claim 1 wherein said adjustments are made to least significant values of said corrective factors to provide enhanced sensitivity to variations in said crosstalk level.

3. The process of claim 2 wherein said corrective factors are multi-bit binary values having least significant bits which are adjusted to equalize said imaging system to said reference level.

4. The process of claim 1 wherein said reference level is recalibrated from time-to-time by operating said imaging system with all of said corrective factors set to null values to remeasure the pre-corrected output intensities of the respective sets of channels, and by then repeating said averaging and selecting steps to provide a recalibrated reference level for said imaging system.

* * * * *